United States Patent
Wentink

(10) Patent No.: US 10,383,141 B2
(45) Date of Patent: Aug. 13, 2019

(54) UPLINK SDMA TRANSMIT OPPORTUNITY SCHEDULING

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 1177 days.

(21) Appl. No.: 12/888,221

(22) Filed: Sep. 22, 2010

(65) Prior Publication Data

US 2011/0235596 A1 Sep. 29, 2011

Related U.S. Application Data

(60) Provisional application No. 61/245,145, filed on Sep. 23, 2009.

(51) Int. Cl.
*H04W 72/12* (2009.01)
*H04W 72/04* (2009.01)

(52) U.S. Cl.
CPC ...... *H04W 72/1284* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 2002/0181425 A1* | 12/2002 | Sherman | H04W 74/0808 370/338 |
| 2002/0181492 A1 | 12/2002 | Kasami et al. | |
| 2005/0003843 A1* | 1/2005 | Ho et al. | 455/509 |
| 2005/0025167 A1* | 2/2005 | Ishibashi et al. | 370/412 |
| 2005/0111479 A1* | 5/2005 | Akatsuka et al. | 370/458 |
| 2005/0271019 A1* | 12/2005 | Yuan | H04W 74/0816 370/338 |
| 2006/0077047 A1* | 4/2006 | Zalitzky | H04B 3/54 340/12.32 |

(Continued)

FOREIGN PATENT DOCUMENTS

| CN | 1926830 A | 3/2007 |
|---|---|---|
| JP | 2003052079 A | 2/2003 |

(Continued)

OTHER PUBLICATIONS

International Search Report and Written Opinion—PCT/US2010/050053, International Search Authority—European Patent Office—Dec. 20, 2010.

(Continued)

*Primary Examiner* — Chirag G Shah
*Assistant Examiner* — Suk Jin Kang
(74) *Attorney, Agent, or Firm* — Steven R. Thiel; Patterson & Sheridan

(57) ABSTRACT

Certain aspects of the present disclosure present medium access control (MAC) protocols for uplink Spatial Division Multiple Access (SDMA) transmissions by one or more stations (STAs). An access point (AP) may receive one or more requests for uplink SDMA transmission from a plurality of stations. The access point may schedule the transmissions by sending a signal to the stations to notify them of the parameters of the uplink SDMA transmissions such as start time, duration of the transmission, spatial streams assigned to each station, and so on.

45 Claims, 9 Drawing Sheets

(56) References Cited

U.S. PATENT DOCUMENTS

| | | |
|---|---|---|
| 2006/0109814 A1 | 5/2006 | Kuzminskiy et al. |
| 2006/0140112 A1* | 6/2006 | Ginzburg ............... 370/229 |
| 2006/0165191 A1* | 7/2006 | Lin et al. ............... 375/267 |
| 2007/0058605 A1* | 3/2007 | Meylan ............ H04W 72/0406 370/346 |
| 2007/0133459 A1* | 6/2007 | Kim ............... H04L 1/0002 370/329 |
| 2007/0263654 A1 | 11/2007 | Salokannel et al. |
| 2008/0013567 A1* | 1/2008 | Benveniste ......... H04L 12/4013 370/447 |
| 2008/0025339 A1* | 1/2008 | Le ............... H04W 4/08 370/445 |
| 2008/0031224 A1* | 2/2008 | Nanda et al. ............... 370/350 |
| 2008/0063106 A1* | 3/2008 | Hahm ............... H04L 1/0003 375/267 |
| 2009/0082028 A1* | 3/2009 | Hosein et al. ............... 455/450 |
| 2009/0207769 A1* | 8/2009 | Park ............... H04W 74/04 370/311 |
| 2009/0225722 A1* | 9/2009 | Cudak et al. ............... 370/330 |
| 2009/0279487 A1 | 11/2009 | Reumerman et al. |
| 2010/0056069 A1* | 3/2010 | Toshimitsu et al. ............ 455/75 |
| 2010/0177721 A1* | 7/2010 | Simonsson ............ H04J 11/005 370/329 |
| 2010/0220678 A1 | 9/2010 | Wentink |
| 2011/0134865 A1* | 6/2011 | Gaur ............... H04W 72/02 370/329 |
| 2011/0305216 A1* | 12/2011 | Seok ............... H04W 74/08 370/329 |
| 2011/0310834 A1* | 12/2011 | Seok ............... H04W 72/0446 370/329 |
| 2012/0002634 A1* | 1/2012 | Seok ............... 370/329 |
| 2012/0051338 A1* | 3/2012 | Seok ............... H04W 74/085 370/337 |
| 2013/0003661 A1* | 1/2013 | Matsuo ............ H04W 74/0833 370/329 |
| 2013/0294373 A1* | 11/2013 | Matsuo ............ H04W 74/0833 370/329 |
| 2014/0105201 A1* | 4/2014 | Seok ............... H04W 72/0446 370/338 |
| 2014/0269544 A1 | 9/2014 | Zhu et al. |
| 2015/0036640 A1* | 2/2015 | Seok ............... H04W 72/042 370/329 |
| 2015/0049727 A1 | 2/2015 | Wentink et al. |

FOREIGN PATENT DOCUMENTS

| | | |
|---|---|---|
| JP | 2006148919 A | 6/2006 |
| JP | 2007502076 A | 2/2007 |
| JP | 2007502079 A | 2/2007 |
| JP | 2007208522 A | 8/2007 |
| JP | 2008035101 A | 2/2008 |
| WO | 05015846 A2 | 2/2005 |
| WO | 2005015812 A1 | 2/2005 |
| WO | 2005039133 A1 | 4/2005 |
| WO | 2009027931 A2 | 3/2009 |
| WO | 2010022091 | 2/2010 |
| WO | 2010099497 | 9/2010 |

OTHER PUBLICATIONS

Zhou S. et al., "An Uplink Medium Access Protocol with SDMA Support for Multiple-Antenna WLANs" Wireless Communications and Networking Conference, 2008. WCNC 2008. IEEE, IEEE, Piscataway, NJ, USA, Mar. 31, 2008 (Mar. 31, 2008), pp. 1809-1814, XP031243907.

Ashley A., et al., "Fractional AIFSN, IEEE 802.11-09/0853r0," IEEE mentor, Jul. 14, 2009.

Chan D., et al., "Insights from CSMA with Multipacket Reception: Achieving >1 Gbps Aggregate Throughput with a Multiuser-based Physical Layer," IEEE 802.11-09/0859r0, IEEE mentor, Jul. 16, 2009.

Ketchum J., et al., "High-Throughput Enhancements for 802.11: Features and Performance of QUALCOMM's Proposal," IEEE 802.11-04/08730r1, IEEE mentor, Sep. 12, 2004, 69pages.

Kim J., et al., "TGac Meeting Minutes—Montreal," Canada, IEEE 802.11-09/0898r0, IEEE mentor, Jul. 16, 2009.

Nee, R.V., et al., "UL MU-MIMO for 11ac", IEEE 802.11-09, 0852-00-00ac, Jul. 2009.

Tandai T., et al., "An Efficient Uplink Multiuser MIMO Protocol in IEEE 802.11 WLANs", Personal, Indoor and Mobile Radio Communications, 2009 IEEE 20th International Symposium on Sep. 16, 2009, pp. 1153-1157.

* cited by examiner

UPLINK SDMA TRANSMIT OPPORTUNITY SCHEDULING

CLAIM OF PRIORITY UNDER 35 U.S.C. § 119

The present Application for Patent claims benefit of U.S. Provisional Patent Application Ser. No. 61/245,145, entitled, "Uplink SDMA Transmit Opportunity Scheduling," filed Sep. 23, 2009, assigned to the assignee hereof and hereby expressly incorporated by reference herein.

BACKGROUND

Field

Certain aspects of the present disclosure generally relate to wireless communications and, more particularly, to transmit opportunity scheduling in uplink spatial division multiple access (SDMA).

Background

In order to address the issue of increasing bandwidth requirements that are demanded for wireless communications systems, different schemes are being developed to allow multiple user terminals to communicate with a single access point (AP) by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications, for example, tens of meters to a few hundred meters.

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S \leq \min\{N_T, N_R\}$. The $N_S$ spatial streams may be used to transmit $N_S$ independent data streams to achieve greater overall throughput.

In wireless networks with a single access point and multiple stations, concurrent transmissions may occur on multiple channels toward different stations, both in the uplink (UL) and downlink (DL) directions. Many challenges are presented in such systems, such as the ability to communicate with legacy devices in addition to non-legacy devices, efficient use of resources, and interference.

SUMMARY

Certain aspects of the present disclosure provide a method for wireless communications. The method generally includes receiving, from one or more apparatuses, one or more request messages for a transmission slot for a spatial division multiple access (SDMA) transmission, and transmitting a transmit opportunity (TXOP) start frame to one or more of the apparatuses to indicate start of a SDMA TXOP.

Certain aspects of the present disclosure provide a method for wireless communications. The method generally includes transmitting a request message for a transmission slot for a spatial division multiple access (SDMA) transmission, receiving a transmit opportunity (TXOP) start frame comprising an indication of start of a SDMA transmission, and transmitting SDMA data during a TXOP in accordance with the TXOP start frame.

Certain aspects of the present disclosure provide an apparatus for wireless communications. The apparatus generally includes a receiver configured to receive, from one or more apparatuses, one or more request messages for a transmission slot for a spatial division multiple access (SDMA) transmission, and a transmitter configured to transmit a transmit opportunity (TXOP) start frame to one or more of the apparatuses to indicate start of a SDMA TXOP.

Certain aspects of the present disclosure provide an apparatus for wireless communications. The apparatus generally includes a transmitter configured to transmit a request message for a transmission slot for a spatial division multiple access (SDMA) transmission, a receiver configured to receive a transmit opportunity (TXOP) start frame comprising an indication of start of a SDMA transmission, and wherein the transmitter is further configured to transmit SDMA data during a TXOP in accordance with the TXOP start frame.

Certain aspects of the present disclosure provide an apparatus for wireless communications. The apparatus generally includes means for receiving, from one or more apparatuses, one or more request messages for a transmission slot for a spatial division multiple access (SDMA) transmission, and means for transmitting a transmit opportunity (TXOP) start frame to one or more of the apparatuses to indicate start of a SDMA TXOP.

Certain aspects of the present disclosure provide an apparatus for wireless communications. The apparatus generally includes means for transmitting a request message for a transmission slot for a spatial division multiple access (SDMA) transmission, means for receiving a transmit opportunity (TXOP) start frame comprising an indication of start of a SDMA transmission, and wherein the means for transmitting further comprises means for transmitting SDMA data during a TXOP in accordance with the TXOP start frame.

Certain aspects of the present disclosure provide a computer-program product for wireless communications, comprising a computer-readable medium comprising instructions. The instructions executable for receiving, from one or more apparatuses, one or more request messages for a transmission slot for a spatial division multiple access (SDMA) transmission, and transmitting a transmit opportunity (TXOP) start frame to one or more of the apparatuses to indicate start of a SDMA TXOP.

Certain aspects of the present disclosure provide a computer-program product for wireless communications, comprising a computer-readable medium comprising instructions. The instructions executable for transmitting a request message for a transmission slot for a spatial division multiple access (SDMA) transmission, receiving a transmit opportunity (TXOP) start frame comprising an indication of start of a SDMA transmission, and transmitting SDMA data during a TXOP in accordance with the TXOP start frame.

Certain aspects provide an access point for wireless communications. The access point generally includes a plurality of antennas, a receiver configured to receive, via the plurality of antennas, from one or more apparatuses, one or more request messages for a transmission slot for a spatial division multiple access (SDMA) transmission, and a transmitter configured to transmit a transmit opportunity (TXOP) start frame to one or more of the apparatuses to indicate start of a SDMA TXOP.

Certain aspects provide a station for wireless communications. The station generally includes at least one antenna, a transmitter configured to transmit, via the at least one antenna, a request message for a transmission slot for a spatial division multiple access (SDMA) transmission, a receiver configured to receive a transmit opportunity (TXOP) start frame comprising an indication of start of a SDMA transmission, and wherein the transmitter is further configured to transmit SDMA data during a TXOP in accordance with the TXOP start frame.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support IEEE 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement Global System for Mobile communications (GSM) or some other standards. These various standards are known in the art.

An Example MIMO System

Figure 1:
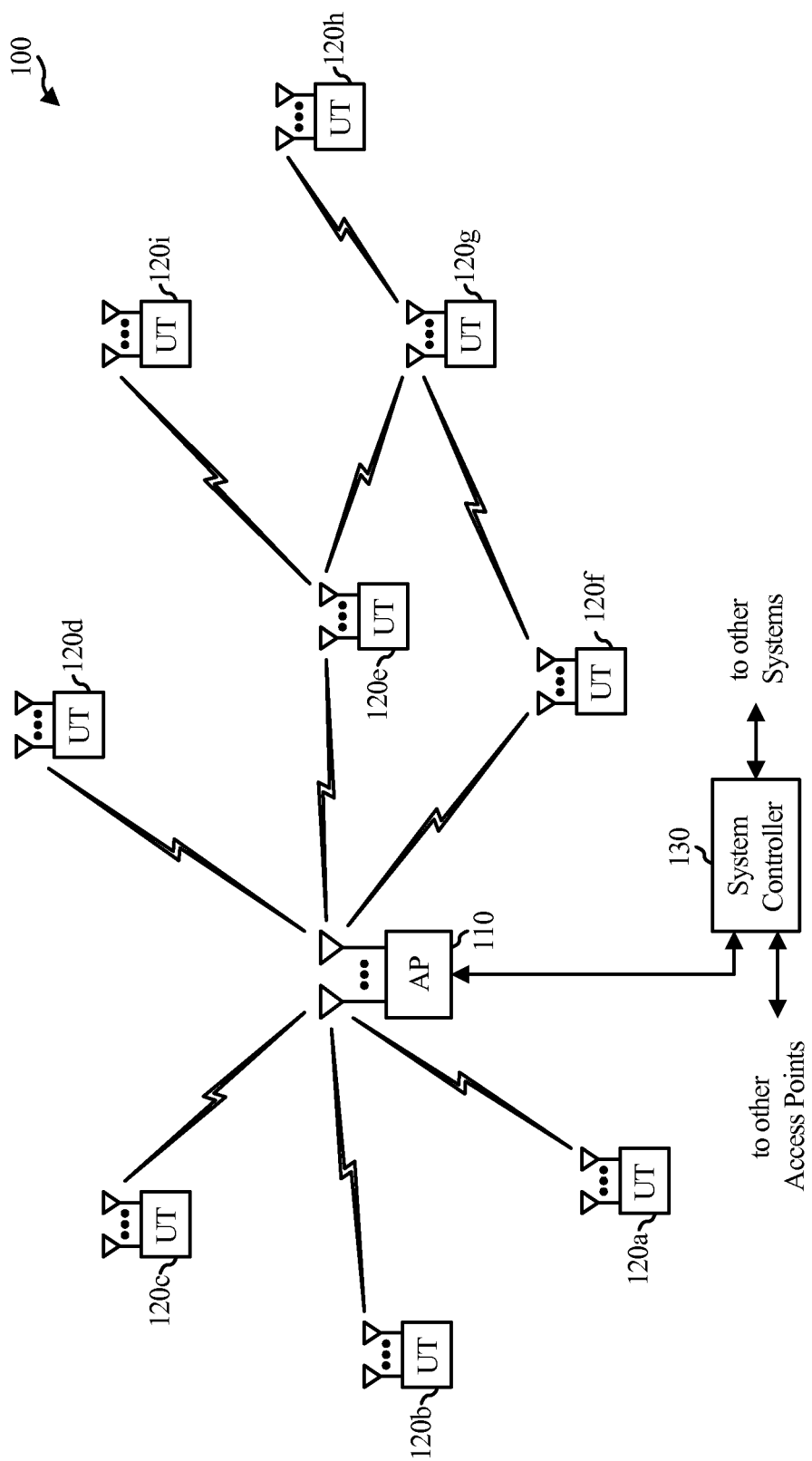
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station, a Node B, an evolved Node B (eNB) or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
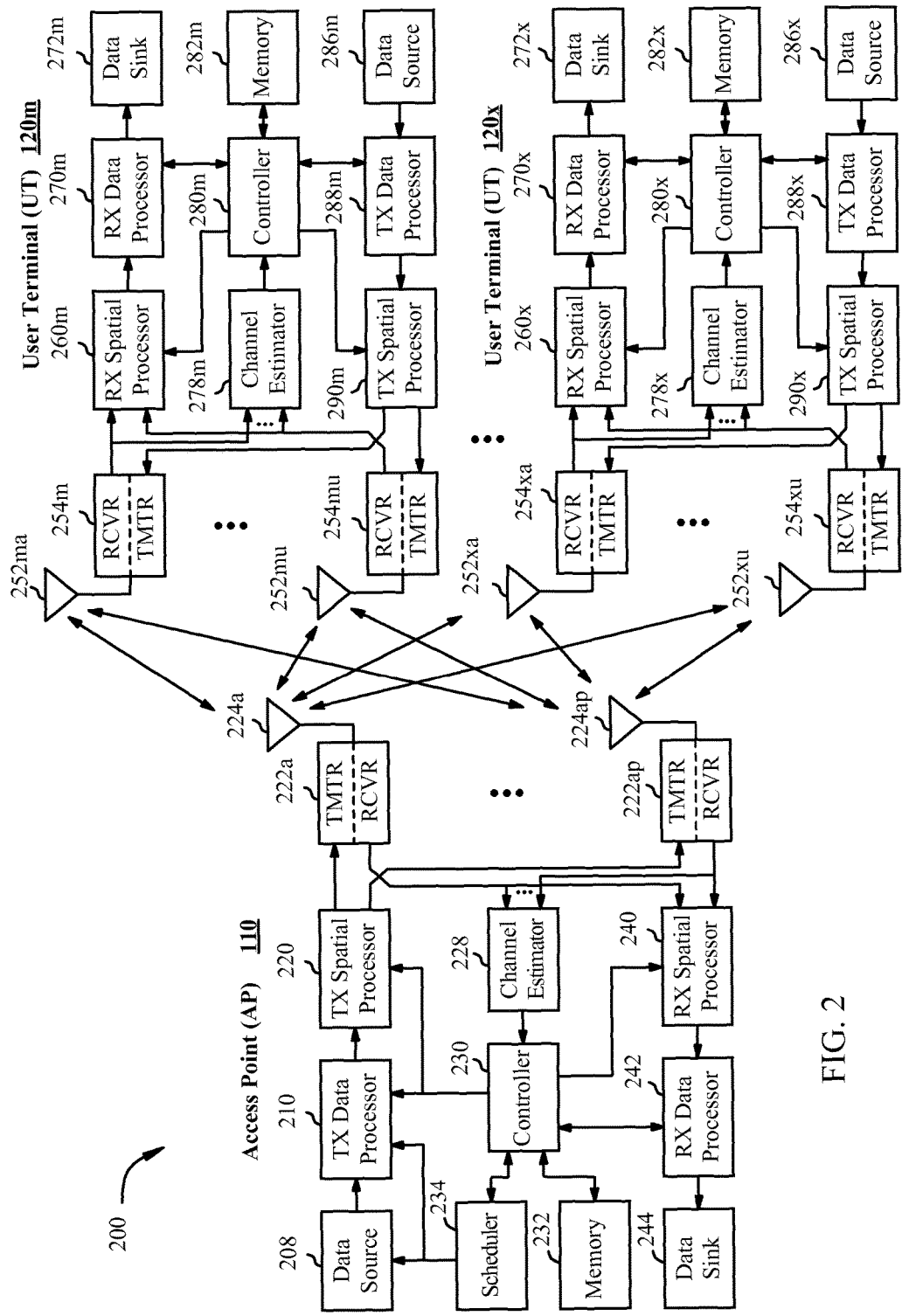
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$, may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. The controller 280 may also be attached to a memory 282. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing. The controller 230 may also be attached to a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
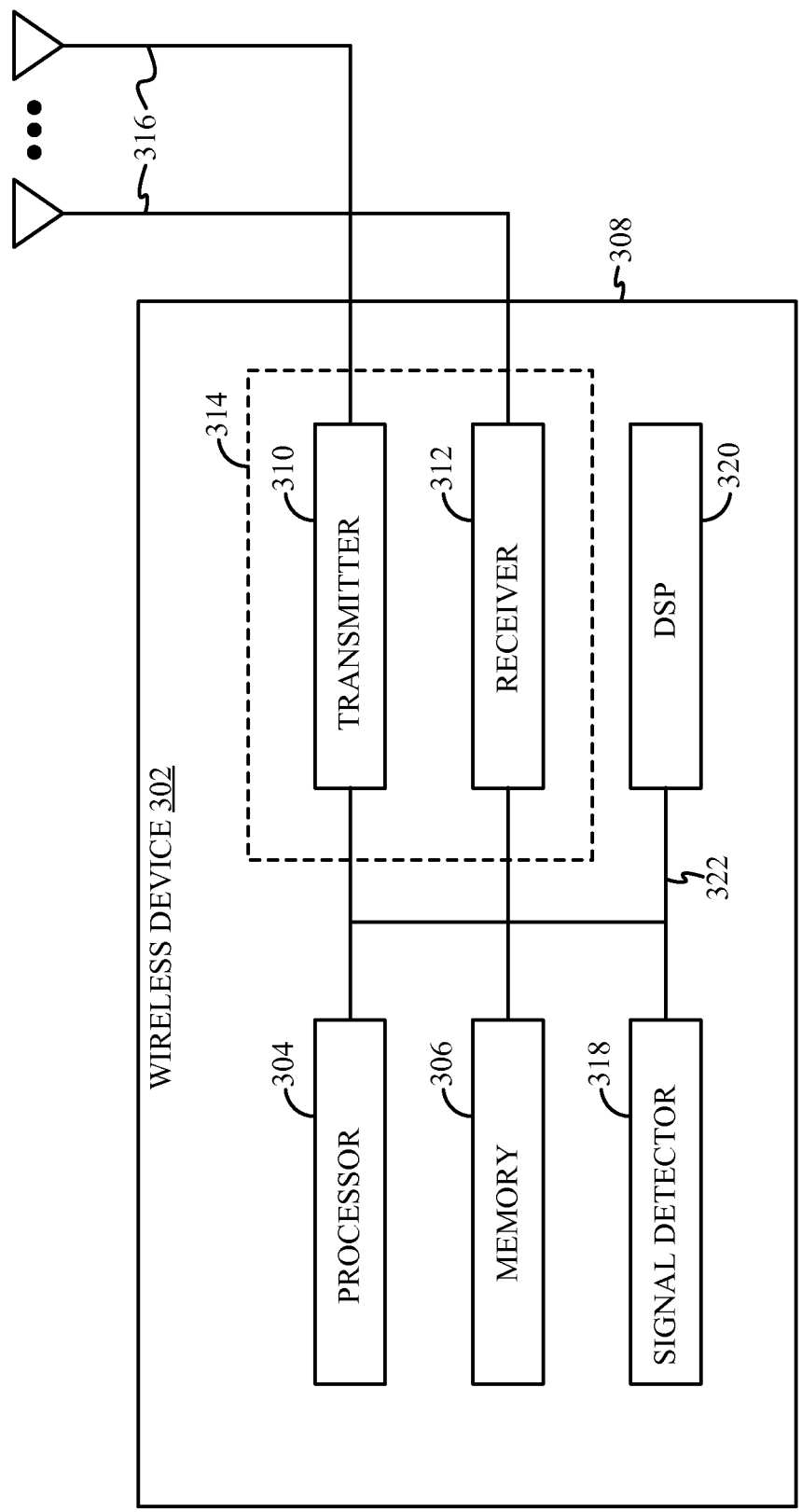
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA, and combinations thereof.

Uplink SDMA Transmit Opportunity Scheduling

Certain aspects of the present disclosure present medium access control (MAC) protocols for uplink SDMA transmissions by one or more stations (STAs). An access point may receive one or more requests for uplink SDMA transmission from a plurality of stations. The access point may schedule the transmissions and send a message to the stations. The message may include parameters of the uplink SDMA transmissions such as starting time, duration of the transmission, spatial streams assigned to each station, and so on.

Figure 4:
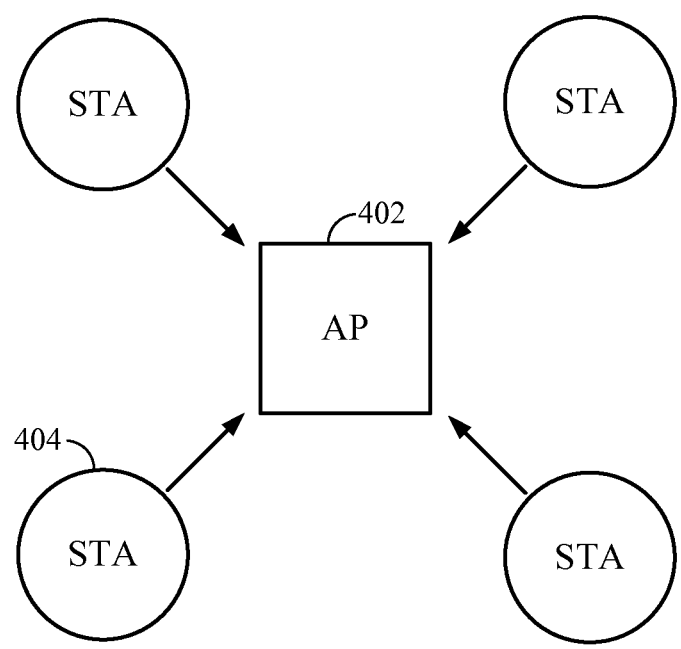
FIG. 4 illustrates an example network consisting of an access point and a plurality of stations, in accordance with certain aspects of the present disclosure.

FIG. 4 illustrates an example network consisting of an access point and a plurality of stations, in accordance with certain aspects of the present disclosure. Utilizing uplink SDMA transmission, two or more of the STAs 404 may transmit data to the access point 402 simultaneously.

In wireless networks utilizing the IEEE 802.11 standard, a Request to Send (RTS)/Clear to Send (CTS) procedure may be used to reserve a portion of a wireless medium for a pending data transmission. However, for uplink SDMA, one or more uplink transmissions (i.e., transmit opportunities (TXOP)) from one or more stations may occur in parallel and at the same time.

For certain aspects of the present disclosure, during an uplink SDMA TXOP, a plurality of stations may transmit to an access point simultaneously. Each STA may use different spatial streams. The AP may schedule uplink SDMA transmissions of different stations and assign one or more spatial streams to each of the stations through a TXOP Start (TXS) frame.

For certain aspects, an AP may enable uplink SDMA at selected STAs and for selected Access Categories (ACs) within those STAs. An Access Category is an equivalent of a frame queue that contends for medium access independent of the other ACs inside an STA. A STA may have four internal ACs. Contention access may be based on Enhanced Distributed Channel Access (EDCA) (i.e., the IEEE 802.11e standard). The EDCA supports differentiated and distributed access to the wireless medium supporting different access categories such as voice, video, best effort and background.

Figure 5:
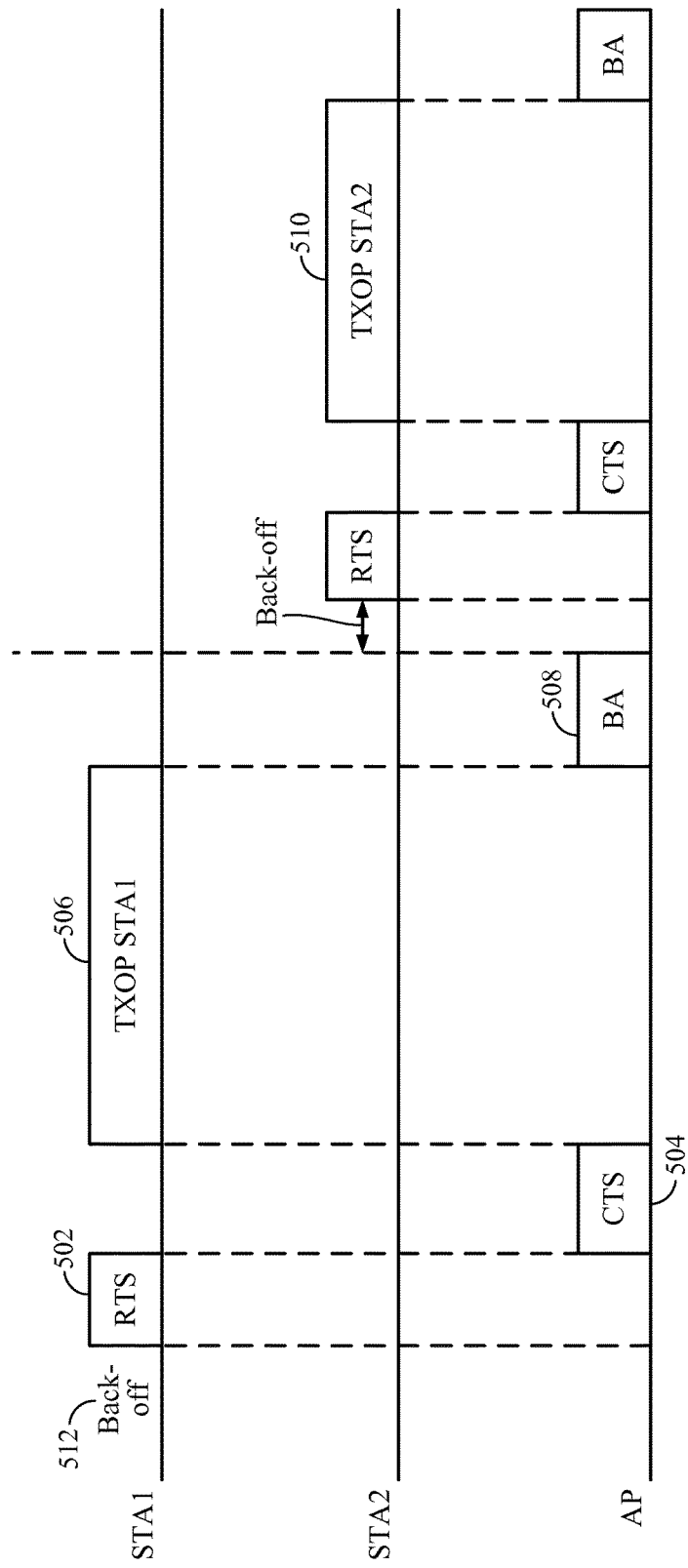
FIG. 5 illustrates message exchange between an access point and two stations utilizing enhanced distributed channel access (EDCA) procedure.

FIG. 5 illustrates message exchange between an access point and two stations utilizing EDCA procedure. As illustrated, when a back-off timer 512 for STA1 expires, STA1 may send an RTS message 502 to the AP. The AP may send a CTS message 504 in response to the RTS. STA1 may then transmit its data in TXOP STA1 506. The access point may acknowledge reception of the data from STA1 by transmitting a block acknowledgement (BA) message 508. During the time that STA1 is transmitting, STA2 may monitor the wireless medium. When STA1 finishes its transmissions, STA2 may transmit an RTS message to the AP to request access to the wireless medium. The AP may also transmit a CTS message and receive transmissions from STA2.

Figure 6:
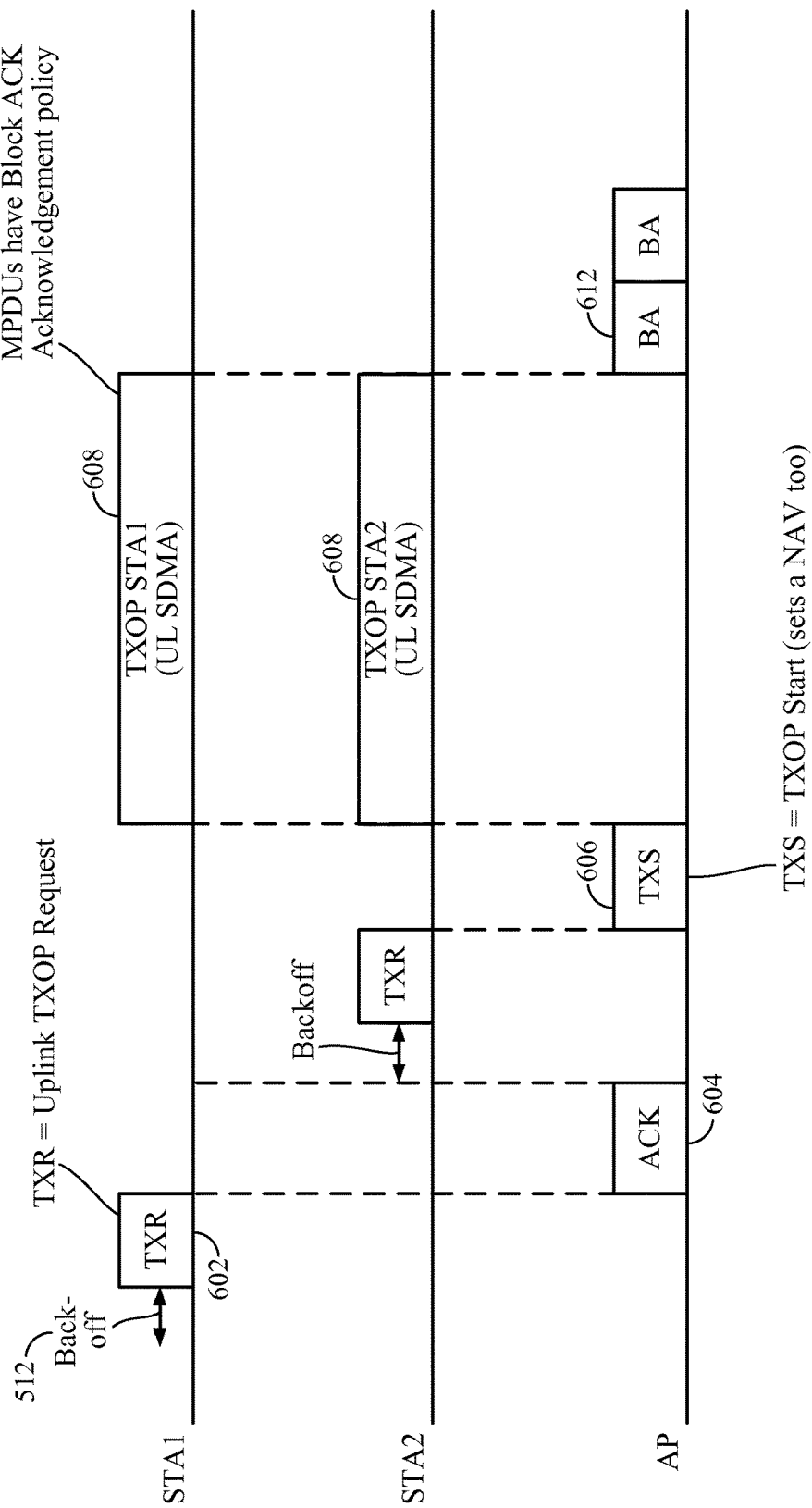
FIG. 6 illustrates message exchange between an access point and two stations utilizing uplink SDMA procedure, in accordance with certain aspects of the present disclosure.

FIG. 6 illustrates message exchange between an access point and two stations utilizing uplink SDMA procedure, in accordance with certain aspects of the present disclosure. The stations are capable of uplink SDMA transmission and uplink SDMA is enabled. An STA may send a TXOP Request (TXR) 602 to the AP instead of sending an RTS 502 (FIG. 5). The TXR is sent when an AC in the STA, that is capable of performing uplink SDMA, gains access to the wireless medium. The TXR 602 may also specify which AC has gained access to the medium (e.g., a back-off timer for the AC has reached zero or expired).

For certain aspects, the AP may start an uplink SDMA TXOP 608 by sending a TXOP Start (TXS) 606 frame to the stations when it received a sufficient number of TXR frames. The TXS frame may specify STA Identifiers (IDs) for the STAs that are included in the uplink SDMA TXOP 608, the spatial streams that are assigned to each of the STAs, and the duration of the uplink SDMA TXOP. The TXR frame may also set a network allocation vector (NAV) for the duration of the uplink SDMA TXOP 608. The NAV may cause other stations that are not participating in uplink SDMA transmissions, to hold off on their transmissions until the uplink SDMA duration is finished. The access point may transmit one or more acknowledgement frames 612 to the STAs to acknowledge reception of the one or more SDMA transmissions.

For certain aspects, the AP may start an uplink SDMA TXOP when a time threshold value is exceeded after receiving a TXR from a STA without receiving additional TXR frames from other STAs.

During the uplink SDMA TXOP 608, a plurality of STAs may transmit data using the spatial streams that are assigned to them in the TXS frame. The transmissions may contain one or more MAC Service Data Units (MSDUs) that are aggregated using Aggregated MSDU (A-MSDU) and one or more MAC Protocol Data Units (MPDUs) that are aggregated using Aggregated MPDU (A-MPDU), or both.

For certain aspects, the MPDUs in the uplink SDMA transmission may indicate an acknowledgement (ACK) policy that does not require an immediate response by the AP. For instance, a Block ACK acknowledgement policy may be used on the uplink transmissions instead of an implicit Block Acknowledgement Request (BAR) acknowledgement policy that is normally used. The uplink transmissions may include a BAR frame, that may request the AP to send a Block Acknowledgement (BA) 612 frame in the next available TXOP for the AP.

For certain aspects, at the end of the uplink SDMA TXOP, the AP may send the requested BA frames. The AP may send the BA frames for one or more stations sequentially. For example, the AP may send a first BA frame 612 for a first station when a Short Inter-frame Space (SIFS) time is passed after the end of the uplink SDMA TXOP 608. The AP may send a second BA frame for the second station when a SIFS time is passed after the end of transmission of the first BA. Accordingly, the BA frames for multiple stations may be separated with SIFS durations.

Figure 7:
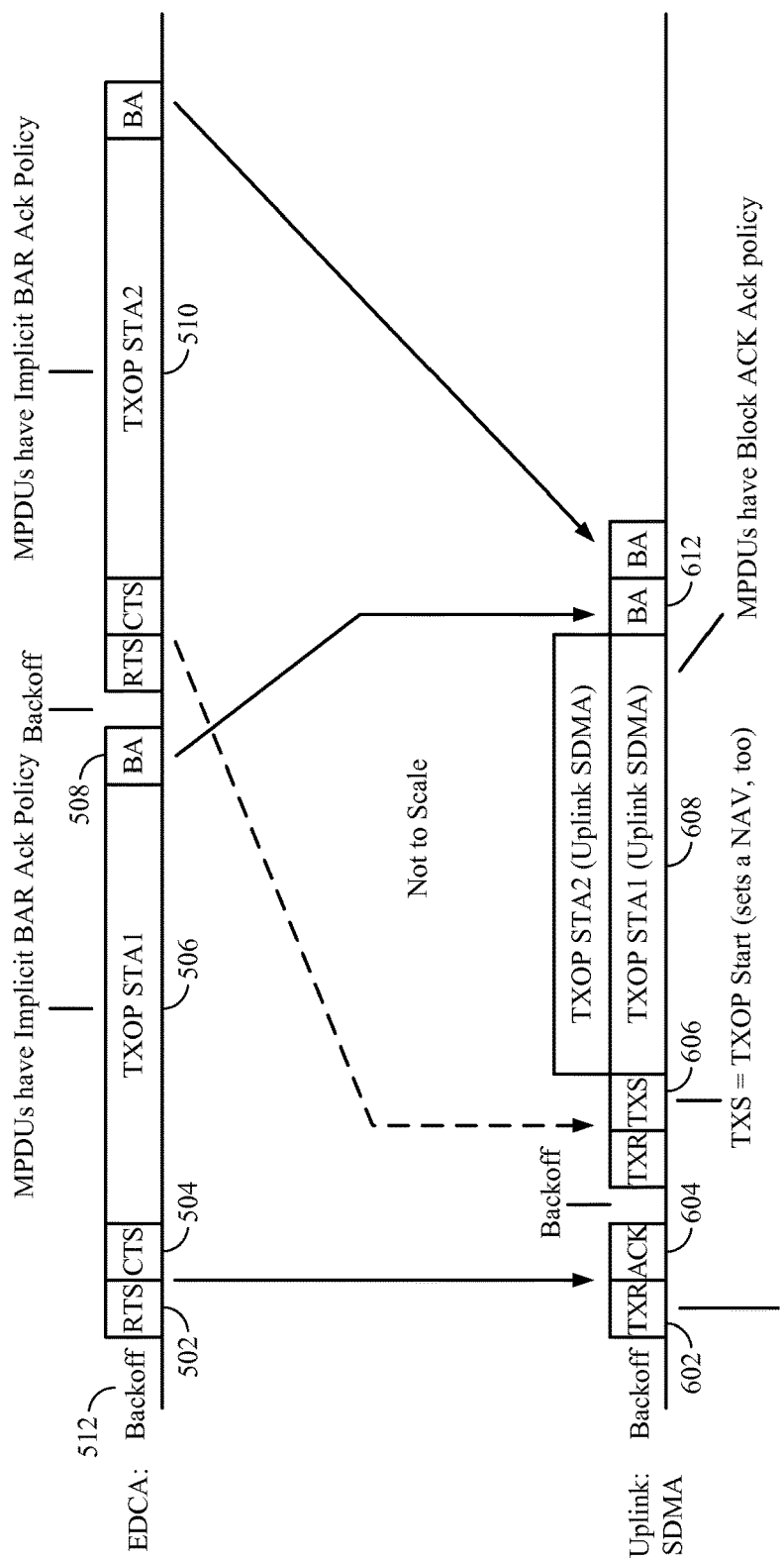
FIG. 7 illustrates a comparison between an EDCA protocol and a proposed uplink SDMA protocol, in accordance with certain aspects of the present disclosure.

FIG. 7 illustrates a comparison between a regular enhanced distributed channel access (EDCA) and a proposed uplink SDMA protocol, in accordance with certain aspects of the present disclosure. The top portion of the figure illustrates packet exchange between an access point and two stations using EDCA procedure, when the stations do not have the ability to perform uplink SDMA. The lower portion of the figure illustrates packet exchange between the access point and two stations using uplink SDMA. As illustrated, since the transmissions in uplink SDMA may be performed in parallel, the time taken for the communication between the AP and a plurality of stations is much smaller in the system utilizing uplink SDMA than the system utilizing the EDCA procedure.

Figure 8:
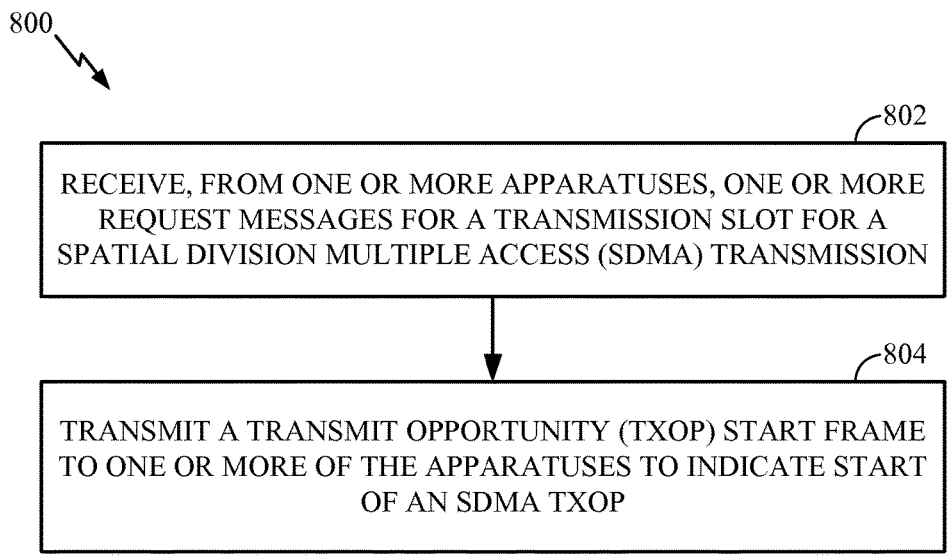
FIG. 8 illustrates example operations for performing uplink spatial division multiple access (SDMA) that may be employed by an access point, in accordance with certain aspects of the present disclosure.

FIG. 8 illustrates example operations for performing uplink SDMA that may be employed by an access point, in accordance with certain aspects of the present disclosure. At 802, one or more request messages for a transmission slot for a spatial division multiple access (SDMA) transmission may be received from one or more apparatuses (e.g., stations). At 804, the access point may transmit a transmit opportunity (TXOP) start frame to one or more of the apparatuses to indicate start of an SDMA TXOP. The access point may determine amount of resource requested by the apparatuses that sent the request messages. If the amount of resource is greater than or equal to a threshold value, the AP may transmit the TXOP start frame.

The access point may receive one or more SDMA transmissions from the apparatuses according to the TXOP start frame. At least one of the SDMA transmissions may indicate an acknowledgement policy that does not require immediate transmission of an acknowledgement frame.

Figure 9:
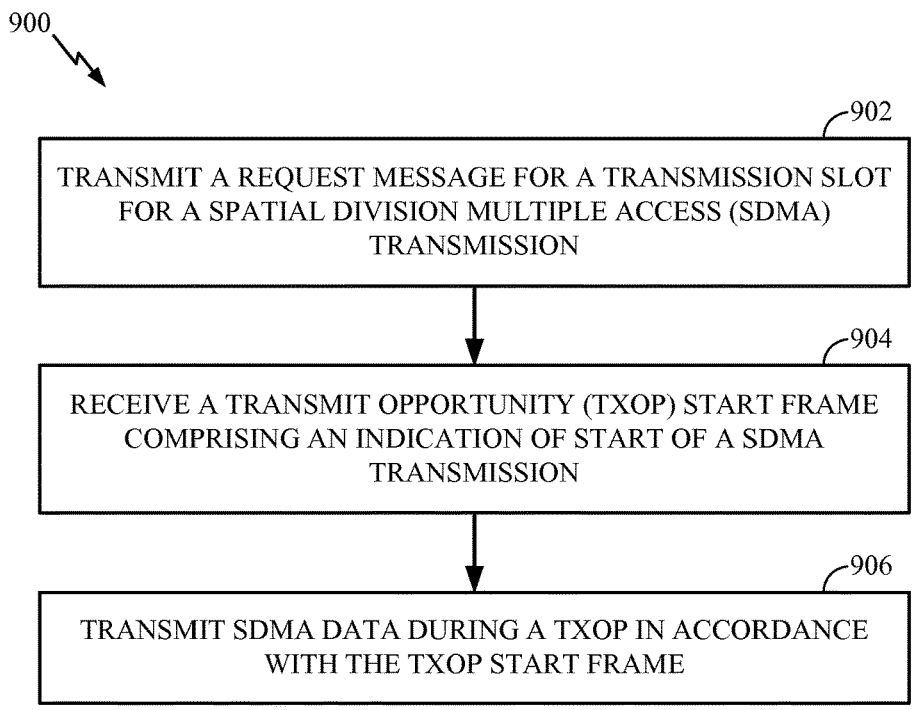
FIG. 9 illustrates example operations for performing uplink SDMA that may be employed by a station, in accordance with certain aspects of the present disclosure.

FIG. 9 illustrates example operations for performing uplink SDMA that may be employed by a station, in accordance with certain aspects of the present disclosure. At 902, a request message for a transmission slot for a spatial division multiple access (SDMA) transmission is transmitted to an apparatus. At 904, a TXS frame is received from the apparatus comprising an indication of start of a SDMA transmission. At 906, SDMA data is transmitted during the TXOP in accordance with the TXOP start frame. The station may transmit the SDMA data on one or more spatial streams utilizing an assigned duration for the TXOP, wherein the spatial streams and the assigned duration are received in the TXOP start frame For certain aspects, the uplink transmissions may not include a BAR frame, and the STAs may send a BAR frame separately after the end of the uplink SDMA TXOP, using EDCA contention. The advantage of this method is that the STA can set a NAV locally through the BAR frame to clear the medium for the duration of the BA reception. The AP may provide the STAs with fixed back-off timer values that they may use for this purpose.

For certain aspects, if the AP does not receive enough TXRs to adequately schedule uplink SDMA TXOPs, the AP may disable uplink SDMA for the stations so that the stations use normal EDCA operations.

Figure 8A:
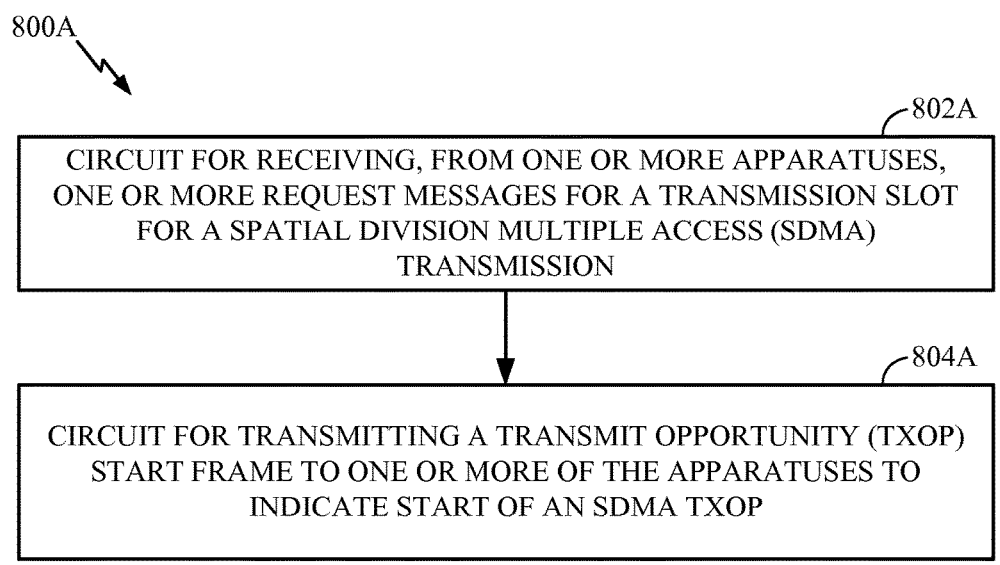
FIG. 8A illustrates example components capable of performing the operations shown in FIG. 8.
Figure 9A:
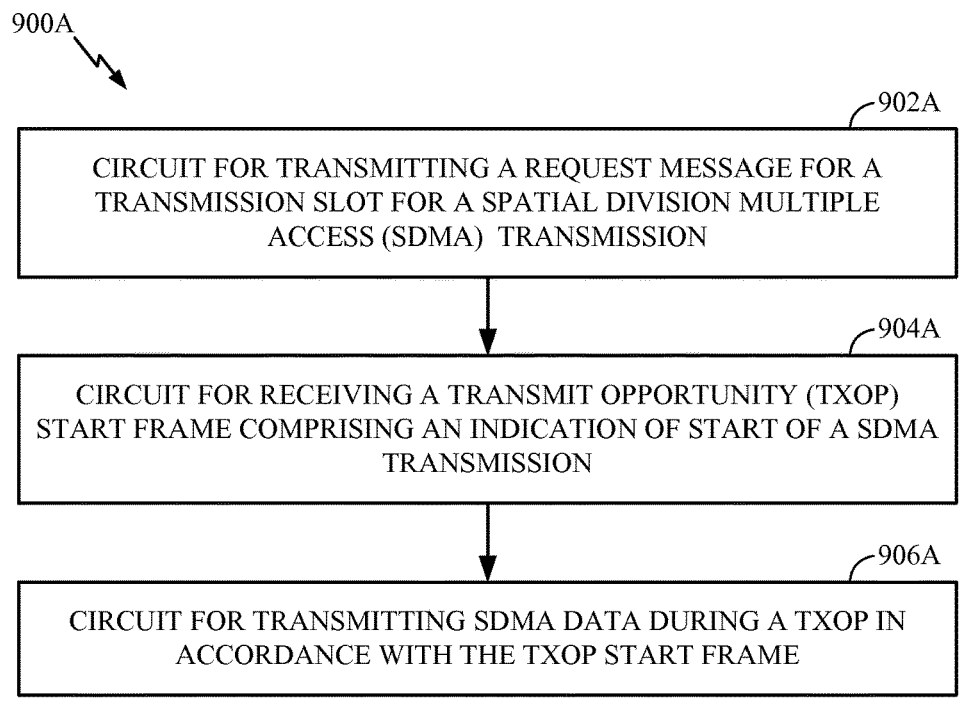
FIG. 9A illustrates example components capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 802-804 in FIG. 8 correspond to circuit blocks 802A-804A illustrated in FIG. 8A. In addition, blocks 902-906 in FIG. 9 correspond to circuit blocks 902A-906A illustrated in FIG. 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises A or B or A and B. It should be noted that means for transmitting comprises a transmitter, means for receiving comprises a receiver, and means for determining comprises a circuit or a processor.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present invention, other and further aspects of the invention may be devised without departing from the basic scope thereof, and the scope thereof is determined by the claims that follow.

What is claimed is:

1. A method for wireless communications, comprising:
   receiving, from a plurality of apparatuses, a plurality of request messages for a transmission slot for a spatial division multiple access (SDMA) transmission; and
   transmitting a transmit opportunity (TXOP) start frame to each apparatus of the plurality of apparatuses to indicate a start of an SDMA TXOP, wherein the TXOP start frame comprises:
      an indication of the apparatuses that are scheduled to transmit during the SDMA TXOP;
      an indication of one or more spatial streams assigned to each of the apparatuses for transmission during the SDMA TXOP; and
      a value for a back-off timer that indicates when a request for acknowledgement can be transmitted by at least one apparatus of the plurality of apparatuses.

2. The method of claim 1, wherein the TXOP start frame comprises an indication of a duration of the SDMA TXOP.

3. The method of claim 1, further comprising:
   transmitting one or more acknowledgement frames to the plurality of apparatuses to acknowledge reception of one or more SDMA transmissions, wherein the acknowledgement frames are sent sequentially.

4. The method of claim 3, wherein the acknowledgement frames are sent if a short inter-frame space (SIFS) time is passed after an end of the SDMA TXOP.

5. The method of claim 4, wherein the acknowledgement frames are separated with SIFS durations.

6. The method of claim 1, further comprising:
   receiving one or more SDMA transmissions from the apparatuses according to the TXOP start frame, wherein at least one of the SDMA transmissions comprises an indication of an acknowledgement policy that does not require immediate transmission of an acknowledgement frame.

7. The method of claim 1, wherein the transmitting comprises:
   determining an amount of resources requested by each of the apparatuses that sent the request messages; and
   transmitting the TXOP start frame if the amount of resources is greater than or equal to a threshold value.

8. The method of claim 1, wherein the transmitting comprises transmitting the TXOP start frame when a time threshold value is exceeded after receiving at least one request message from an apparatus of the plurality of apparatuses without receiving additional request messages from other apparatuses of the plurality of apparatuses.

9. A method for wireless communications, comprising:
   transmitting a request message for a transmission slot for a spatial division multiple access (SDMA) transmission;

receiving a transmit opportunity (TXOP) start frame comprising:
an indication of a start of an SDMA transmission;
an indication of a plurality of apparatuses that are scheduled to transmit during the TXOP;
an indication of one or more spatial streams assigned to each of the apparatuses of the plurality of apparatuses for transmission during the TXOP; and
a value for a back-off timer that indicates when a request for acknowledgement can be transmitted by at least one apparatus of the plurality of apparatuses; and
transmitting SDMA data during a TXOP in accordance with the TXOP start frame.

10. The method of claim 9, wherein the transmitting the SDMA data comprises:
transmitting the SDMA data on one or more spatial streams utilizing an assigned duration for the TXOP, wherein the spatial streams and the assigned duration are received in the TXOP start frame.

11. The method of claim 9, wherein the SDMA data comprises an indication of an acknowledgement policy that does not require immediate transmission of an acknowledgement frame.

12. The method of claim 11, wherein the SDMA data comprises one or more Block Acknowledgement Request (BAR) frames.

13. The method of claim 9, further comprising:
transmitting the request for acknowledgement after transmission of the SDMA data.

14. The method of claim 13, wherein the request for acknowledgement is transmitted after the back-off timer expires.

15. The method of claim 9, wherein the SDMA data comprises one or more medium access control protocol data units (MPDUs).

16. An apparatus for wireless communications, comprising:
a receiver configured to receive, from a plurality of apparatuses, a plurality of request messages for a transmission slot for a spatial division multiple access (SDMA) transmission;
a transmitter configured to transmit a transmit opportunity (TXOP) start frame to each apparatus of the plurality of apparatuses to indicate a start of an SDMA TXOP, wherein the TXOP start frame comprises:
an indication of the apparatuses that are scheduled to transmit during the SDMA TXOP;
an indication of one or more spatial streams assigned to each of the apparatuses for transmission during the SDMA TXOP; and
a value for a back-off timer that indicates when a request for acknowledgement can be transmitted by at least one apparatus of the plurality of apparatuses.

17. The apparatus of claim 16, wherein the TXOP start frame comprises an indication of a duration of the SDMA TXOP.

18. The apparatus of claim 16, wherein the transmitter is further configured to transmit one or more acknowledgement frames to the plurality of apparatuses to acknowledge reception of one or more SDMA transmissions, wherein the acknowledgement frames are sent sequentially.

19. The apparatus of claim 18, wherein the acknowledgement frames are sent if a short inter-frame space (SIFS) time is passed after an end of the SDMA TXOP.

20. The apparatus of claim 19, wherein the acknowledgement frames are separated with SIFS durations.

21. The apparatus of claim 16, wherein the receiver is further configured to receive one or more SDMA transmissions from the apparatuses according to the TXOP start frame, wherein at least one of the SDMA transmissions comprises an indication of an acknowledgement policy that does not require immediate transmission of an acknowledgement frame.

22. An apparatus for wireless communications, comprising:
a transmitter configured to transmit a request message for a transmission slot for a spatial division multiple access (SDMA) transmission;
a receiver configured to receive a transmit opportunity (TXOP) start frame comprising:
an indication of a start of an SDMA transmission;
an indication of a plurality of apparatuses that are scheduled to transmit during the TXOP;
an indication of one or more spatial streams assigned to each of the apparatuses of the plurality of apparatuses for transmission during the TXOP; and
a value for a back-off timer that indicates when a request for acknowledgement can be transmitted by at least one apparatus of the plurality of apparatuses; and
wherein the transmitter is further configured to transmit SDMA data during a TXOP in accordance with the TXOP start frame.

23. The apparatus of claim 22, wherein the transmitter is further configured to transmit the SDMA data on one or more spatial streams utilizing an assigned duration for the TXOP, wherein the spatial streams and the assigned duration are received in the TXOP start frame.

24. The apparatus of claim 22, wherein the SDMA data comprises an indication of an acknowledgement policy that does not require immediate transmission of an acknowledgement frame.

25. The apparatus of claim 24, wherein the SDMA data comprises one or more Block Acknowledgement Request (BAR) frames.

26. The apparatus of claim 22, wherein the transmitter is further configured to transmit the request for acknowledgement after transmission of the SDMA data.

27. The apparatus of claim 26, wherein the request for acknowledgement is transmitted after the back-off timer expires.

28. The apparatus of claim 22, wherein the SDMA data comprises one or more medium access control protocol data units (MPDUs).

29. An apparatus for wireless communications, comprising:
means for receiving, from a plurality of apparatuses, a plurality of request messages for a transmission slot for a spatial division multiple access (SDMA) transmission;
means for transmitting a transmit opportunity (TXOP) start frame to each apparatus of the plurality of apparatuses to indicate a start of an SDMA TXOP, wherein the TXOP start frame comprises:
an indication of the apparatuses that are scheduled to transmit during the SDMA TXOP;
an indication of one or more spatial streams assigned to each of the apparatuses for transmission during the SDMA TXOP; and
a value for a back-off timer that indicates when a request for acknowledgement can be transmitted by at least one apparatus of the plurality of apparatuses.

30. The apparatus of claim 29, wherein the TXOP start frame comprises an indication of a duration of the SDMA TXOP.

31. The apparatus of claim 29, the means for transmitting further comprises:
means for transmitting one or more acknowledgement frames to the plurality of apparatuses to acknowledge reception of one or more SDMA transmissions, wherein the acknowledgement frames are sent sequentially.

32. The apparatus of claim 31, wherein the acknowledgement frames are sent if a short inter-frame space (SIFS) time is passed after an end of the SDMA TXOP.

33. The apparatus of claim 32, wherein the acknowledgement frames are separated with SIFS durations.

34. The apparatus of claim 29, wherein the means for receiving further comprises:
means for receiving one or more SDMA transmissions from the apparatuses according to the TXOP start frame, wherein at least one of the SDMA transmissions comprises an indication of an acknowledgement policy that does not require immediate transmission of an acknowledgement frame.

35. An apparatus for wireless communications, comprising:
means for transmitting a request message for a transmission slot for a spatial division multiple access (SDMA) transmission;
means for receiving a transmit opportunity (TXOP) start frame comprising;
an indication of a start of an SDMA transmission
an indication of a plurality of apparatuses that are scheduled to transmit during the TXOP;
an indication of one or more spatial streams assigned to each of the apparatuses for transmission during the TXOP; and
a value for a back-off timer that indicates when a request for acknowledgement can be transmitted by at least one apparatus of the plurality of apparatuses; and
wherein the means for transmitting further comprises means for transmitting SDMA data during a TXOP in accordance with the TXOP start frame.

36. The apparatus of claim 35, wherein the means for transmitting the SDMA data comprises:
means for transmitting the SDMA data on one or more spatial streams utilizing an assigned duration for the TXOP, wherein the spatial streams and the assigned duration are received in the TXOP start frame.

37. The apparatus of claim 35, wherein the SDMA data comprises an indication of an acknowledgement policy that does not require immediate transmission of an acknowledgement frame.

38. The apparatus of claim 37, wherein the SDMA data comprises one or more Block Acknowledgement Request (BAR) frames.

39. The apparatus of claim 35, wherein the means for transmitting further comprises:
means for transmitting the request for acknowledgement after transmission of the SDMA data.

40. The apparatus of claim 39, wherein the request for acknowledgement is transmitted after the back-off timer expires.

41. The apparatus of claim 35, wherein the SDMA data comprises one or more medium access control protocol data units (MPDUs).

42. A computer-readable storage device comprising instructions executable for:
receiving, from a plurality of apparatuses, a plurality of request messages for a transmission slot for a spatial division multiple access (SDMA) transmission; and
transmitting a transmit opportunity (TXOP) start frame to each apparatus of the plurality of apparatuses to indicate a start of an SDMA TXOP, wherein the TXOP start frame comprises:
an indication of the apparatuses that are scheduled to transmit during the SDMA TXOP;
an indication of one or more spatial streams assigned to each of the apparatuses for transmission during the SDMA TXOP; and
a value for a back-off timer that indicates when a request for acknowledgement can be transmitted by at least one apparatus of the plurality of apparatuses.

43. A computer-readable storage device comprising instructions executable for:
transmitting a request message for a transmission slot for a spatial division multiple access (SDMA) transmission;
receiving a transmit opportunity (TXOP) start frame comprising:
an indication of a start of an SDMA transmission;
an indication of a plurality of apparatuses that are scheduled to transmit during the TXOP
an indication of one or more spatial streams assigned to each apparatus of the plurality of apparatuses for transmission during the TXOP; and
a value for a back-off timer that indicates when a request for acknowledgement can be transmitted by at least one apparatus of the plurality of apparatuses; and
transmitting SDMA data during a TXOP in accordance with the TXOP start frame.

44. An access point for wireless communications, comprising:
a plurality of antennas,
a receiver configured to receive, via the plurality of antennas, from a plurality of apparatuses, a plurality of request messages for a transmission slot for a spatial division multiple access (SDMA) transmission;
a transmitter configured to transmit a transmit opportunity (TXOP) start frame to each apparatus of the plurality of the apparatuses to indicate a start of an SDMA TXOP, wherein the TXOP start frame comprises:
an indication of the apparatuses that are scheduled to transmit during the SDMA TXOP;
an indication of one or more spatial streams assigned to each of the apparatuses for transmission during the SDMA TXOP; and
a value for a back-off timer that indicates when a request for acknowledgement can be transmitted by at least one apparatus of the plurality of apparatuses.

45. A station for wireless communications, comprising:
at least one antenna;
a transmitter configured to transmit, via the at least one antenna, a request message for a transmission slot for a spatial division multiple access (SDMA) transmission;
a receiver configured to receive a transmit opportunity (TXOP) start frame comprising:
an indication of a start of an SDMA transmission
an indication of a plurality of stations that are scheduled to transmit during the TXOP
an indication of one or more spatial streams assigned to each station of the plurality of stations for transmission during the TXOP; and a value for a back-off timer that indicates when a request for acknowledgement can be transmitted by at least one apparatus of the plurality of apparatuses; and wherein the transmitter is further configured to transmit 5 SDMA data during a TXOP in accordance with the TXOP start frame.

\* \* \* \* \*